United States Patent
Hayashi et al.

(10) Patent No.: US 9,180,810 B2
(45) Date of Patent: Nov. 10, 2015

(54) BASE, ILLUMINATION APPARATUS USING THE SAME, AND INTERIOR MATERIAL

(71) Applicant: TOYOTA BOSHOKU KABUSHIKI KAISHA, Aichi-ken (JP)

(72) Inventors: Nobuki Hayashi, Aichi-ken (JP); Jun Isami, Aichi-ken (JP); Yousuke Tagami, Gifu-ken (JP); Takuma Saitou, Aichi-ken (JP)

(73) Assignee: TOYOTA BOSHOKU KABUSHIKI KAISHA, Aichi-Ken (JP)

( * ) Notice: Subject to any disclaimer, the term of this patent is extended or adjusted under 35 U.S.C. 154(b) by 0 days.

(21) Appl. No.: 14/307,852

(22) Filed: Jun. 18, 2014

(65) Prior Publication Data

US 2014/0376241 A1    Dec. 25, 2014

(30) Foreign Application Priority Data

Jun. 21, 2013 (JP) ................. 2013-130821
Jun. 21, 2013 (JP) ................. 2013-130826
Jun. 21, 2013 (JP) ................. 2013-130827

(51) Int. Cl.
*B60Q 1/00* (2006.01)
*B60Q 3/00* (2006.01)
*B60Q 3/02* (2006.01)

(52) U.S. Cl.
CPC .......... *B60Q 3/0283* (2013.01); *B60Q 2500/10* (2013.01)

(58) Field of Classification Search
CPC .......................... B60Q 3/0283; B60Q 2500/10
USPC .................................... 362/488–489
See application file for complete search history.

(56) References Cited

U.S. PATENT DOCUMENTS

| | | | | |
|---|---|---|---|---|
| 3,414,455 | A | * | 12/1968 | Twomey, Jr. et al. ......... 428/328 |
| 4,645,970 | A | * | 2/1987 | Murphy ........................ 313/509 |
| 7,857,474 | B2 | * | 12/2010 | Selby et al. ................... 362/97.1 |
| 8,376,596 | B2 | * | 2/2013 | Beau et al. .................... 362/488 |
| 2003/0170460 | A1 | * | 9/2003 | Sienkiewicz et al. ....... 428/411.1 |
| 2008/0203755 | A1 | * | 8/2008 | Bourgeois-Jacquet et al. ........................... 296/97.5 |
| 2008/0211866 | A1 | * | 9/2008 | Hill ................................. 347/42 |
| 2012/0327673 | A1 | * | 12/2012 | Ureta Hortiguela et al. . 362/490 |
| 2013/0114276 | A1 | * | 5/2013 | Lee ................................. 362/459 |
| 2013/0335997 | A1 | * | 12/2013 | Roberts et al. ................ 362/583 |

FOREIGN PATENT DOCUMENTS

| | | |
|---|---|---|
| JP | 2009-101840 | 5/2009 |
| JP | 2012-86842 | 5/2012 |
| WO | 01/63172 | 8/2001 |

* cited by examiner

*Primary Examiner* — Donald Raleigh
(74) *Attorney, Agent, or Firm* — Greenblum & Bernstein, P.L.C.

(57) ABSTRACT

The base of the present invention includes a fiber base layer containing fibers, and has a basis weight of 300 to 1,500 g/m$^2$, a thickness of 1 to 10 mm, and a transmittance of 35% to 75%. A content of fibers is in a range from 20% to 70% by mass based on 100% by mass of the fiber base layer. The illumination apparatus of the present invention includes the base and a light source.

11 Claims, 6 Drawing Sheets

BASE, ILLUMINATION APPARATUS USING THE SAME, AND INTERIOR MATERIAL

INCORPORATION BY REFERENCE

The present application claims priority under 35 U.S.C. §119 of Japanese Patent Application Nos. 2013-130821, filed on Jun. 21, 2013; 2013-130826, filed on June 21; and 2013-130827, filed on June 21, the disclosures of which are expressly incorporated by reference herein in their entirety.

TECHNICAL FIELD

The invention relates to a base, an illumination apparatus using the same, and an interior material.

BACKGROUND ART

Various types of interior illumination apparatus have been known as an interior illumination apparatus used for vehicles and the like. For example, JP-A 2012-86842 discloses an interior illumination apparatus in which a base, and a skin layer that is formed by staking a fabric on the base are provided, and a light source is disposed in a recess or the like that is formed in the base on the side of the skin layer.

An illumination apparatus that improves effects of light during nighttime has also been known. For example, JP-A 2009-101840 discloses a vehicular illumination apparatus in which a translucent core material, a translucent skin material, a film that has a design pattern and is disposed between the core material and the skin material, and an illumination unit that is disposed on the side of the core material, and the vehicular illumination apparatus is configured so that the design pattern of the film appears on the skin material utilizing light that has been emitted from the illumination unit and has passed through the core material.

SUMMARY OF THE INVENTION

According to JP-A 2012-86842, the light source is disposed in the recess formed in the base after bonding the base to a vehicular ceiling or the like, and a surface material (fabric) for a skin layer is bonded thereto. Therefore, the assembly is complex. Moreover, since it is necessary to remove the skin layer when exchanging the light source, handling is difficult.

An illumination apparatus having a structure in which the base and the light source are separated may be advantageous taking account of ease of assembly and removal. For example, the illumination apparatus may be designed to have a structure in which the light source is disposed so that light emitted from the light source passes through the base.

However, a base that allows light to pass through while exhibiting sufficient rigidity has not been known, and development of such a base has been desired.

An object of the present invention is to provide a base that allows light to pass through while exhibiting sufficient flexural rigidity, and an illumination apparatus that facilitates assembly and removal.

According to JP-A 2009-101840, it is necessary to separately provide a film having a pattern between the translucent core material and the translucent skin material, and thus it may be difficult to utilize a general-purpose production apparatus when forming the film.

Another object of the present invention is to provide an interior material that includes a light source, can be produced using a forming press for mass production, and allows a design (e.g., pattern) that is not observed when the light source does not emit light to appear on the surface (front side) of a skin layer when the light source emits light.

Another object of the present invention is to provide a vehicular interior material that includes a light source, has a simple configuration, and allows a design (e.g., pattern) which is not observed when the light source does not emit light to appear when the light source emits light.

A first aspect of the present invention (hereinafter, referred to as "first invention") is a base which includes a fiber base layer having fibers, and is characterized in that the base has a basis weight of 300 to 1,500 g/m$^2$ and a thickness of 1 to 10 mm, that a content of the fibers in the fiber base layer is in a range from 20% to 70% by mass based on 100% by mass of the fiber base layer, and that a transmittance of the base calculated by $[(B/A) \times 100(\%)]$ is in a range from 35% to 75%, where, A is an illuminance measured at an irradiation target surface directly under a center of a surface-emitting light source (100 mm×100 mm) when a light is emitted from the surface-emitting light source that is disposed at a distance of 600 mm from the irradiation target surface so that an emitting surface of the surface-emitting light source is parallel to the irradiation target surface, and B is an illuminance measured at the irradiation target surface directly under the center of the surface-emitting light source when a light is emitted from the surface-emitting light source that is disposed on a back side of the base, the base being disposed at a distance of 600 mm from the irradiation target surface so that an emitting surface of the base is parallel to the irradiation target surface.

A second aspect of the present invention (hereinafter, referred to as "second invention") is an illumination apparatus which includes the base of the first invention, and a light source that is provided on a back side of the base, and is characterized in that a light emitted from the light source passes through the base from the back side to a front side of the base.

In the second invention, the illumination apparatus may have a configuration in which the base has a skin layer on a surface side of the base, the skin layer has a print area and a non-print area at an inner side, and an image based on a design at the skin layer appears on a front side of the skin layer when a light emitted from the light source passes through the skin layer, and a difference DD1 in transmittance for the skin layer calculated by $[|(X1-Y1)/X1| \times 100(\%)]$ is in a range from 5% to 60%, where, X1 is an illuminance measured at an irradiation target surface directly under the non-print area when a light is emitted from a surface-emitting light source (100 mm×100 mm), and Y1 is an illuminance measured at the irradiation target surface directly under the print area when a light is emitted from the surface-emitting light source, the surface-emitting light source being placed on a back side of the skin layer, and the irradiation target surface being positioned at a distance of 600 mm from the front side of the skin layer so that the irradiation target surface is parallel to the front side of the skin layer.

A third aspect of the present invention (hereinafter, referred to as "third invention") is an interior material which includes a translucent base, an illumination means provided on a back side of the translucent base, and a skin layer provided on a surface side of the translucent base, and is characterized in that the skin layer has a print area and a non-print area at a side of the translucent base, and an image based on a design at the skin layer appears on a front side of the skin layer when a light emitted from the illumination means passes through the skin layer, and that a difference DD2 in transmittance for the skin layer calculated by $[|(X2-Y2)/X2| \times 100 (\%)]$ is in a range from 5% to 60%, where, X2 is an illuminance measured at an irradiation target surface directly under the non-print area when a light is emitted from a surface-emitting light source (100 mm×100 mm), and Y2 is an illuminance measured at the irradiation target surface directly under the print area when a light is emitted from the surface-emitting light source, the surface-emitting light source being placed on a back side of the skin layer, and the irradiation target surface being positioned at a distance of 600 mm from the front side of the skin layer so that the irradiation target surface is parallel to the front side of the skin layer.

A fourth aspect of the present invention (hereinafter, referred to as "fourth invention") is a vehicular interior material which includes a translucent base, an air-barrier film layer provided on a back side of the translucent base, and an illumination means provided on a back side of the air-barrier film layer, and is characterized in that the air-barrier film layer is decorated, and an image based on a design at the air-barrier film layer appears on a front side of said vehicular interior material when a light emitted from said illumination means passes through said air-barrier film layer.

Advantageous Effects of the Invention

Since the base of the first invention includes the fiber base layer, and has a specific basis weight and a specific thickness, the base exhibits sufficient flexural rigidity. Since the base of the first invention has a specific transmittance, the base can be widely used in the field of an illumination apparatus.

According to the illumination apparatus of the second invention including the base of the first invention, and the light source, the illumination apparatus allows light emitted from the light source to pass through the base from one side to the other side to achieve the desired illuminance. Since the illumination apparatus is configured so that it is unnecessary to place the light source in the base, and the light source and the base can be independently assembled to a specific part, the constituent parts of the illumination apparatus can be easily assembled and removed.

In the illumination apparatus of the second invention, the base may include a skin layer that is provided on one side of the fiber base layer, a print area and a non-print area may be provided on the surface of the skin layer situated on the side of the fiber base layer, and the difference DD1 in transmittance between the print area and the non-print area may be set within a specific range. In this case, the illumination apparatus allows an image (e.g., pattern) that is not observed when the light source does not emit light to appear on the surface (front side) of the skin layer when the light source emits light, and can improve the interior atmosphere.

In the illumination apparatus of the second invention, the base may include an air-barrier film layer that is decorated and provided on one side of the fiber base layer. In this case, the illumination apparatus allows an image (e.g., pattern) that is not observed when the light source does not emit light to appear on the surface of the illumination apparatus when the light source emits light, and can improve the interior atmosphere using a simple structure.

According to the interior material of the third invention in which the skin layer having the print area and the non-print area is provided on the back side, and the difference DD 1 in transmittance between the print area and the non-print area is set within a specific range, the interior material allows a design (e.g., pattern) that is not observed when the illumination means does not emit light to appear on the surface (front side) of the skin layer when the illumination means emits light, and can improve the interior atmosphere. Since the print area is formed directly on the back side of the skin layer, a forming press for mass production can be used when producing the interior material, and excellent productivity can be achieved.

The vehicular interior material of the fourth invention has a simple structure, allows a design (e.g., pattern) that is not observed when the illumination means does not emit light to appear on the surface (front side) of the interior material when the illumination means emits light, and can improve the interior atmosphere.

In the case where the adhesive layer is formed on one side or each side of the air-barrier film, the handling capability of the air-barrier film can be improved, and the vehicular interior material can be efficiently produced.

In the case where the air-barrier film is decorated by printing, the vehicular interior material allows various types of design (e.g., pattern) to appear on the surface (front side) of the interior material when the illumination means emits light, and can further improve the interior atmosphere.

BRIEF DESCRIPTION OF DRAWINGS

The present invention is further described in the detailed description which follows, in reference to the noted plurality of drawings by way of non-limiting examples of exemplary embodiments of the present invention, in which like reference numerals represent similar parts throughout the several views of the drawings, and wherein.

DESCRIPTION OF EMBODIMENTS

Figure 1:
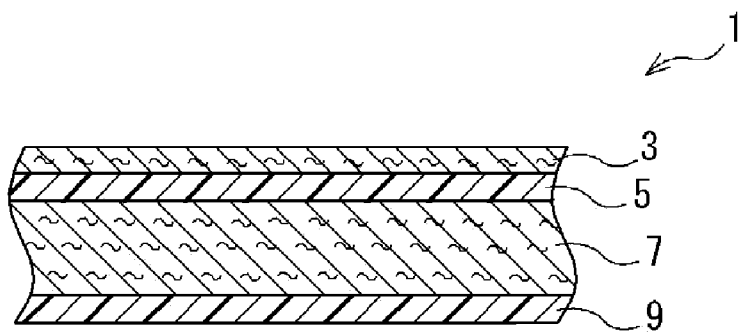
FIG. 1 is a schematic cross-sectional view illustrating the base of Example 1-1.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show structural details of the present invention in more detail than is necessary for the fundamental understanding of the present invention, the description is taken with the drawings making apparent to those skilled in the art how the forms of the present invention may be embodied in practice.

1. Base

The base of the first invention includes a layer which is formed using a fiber base containing fibers.

The fibers included in the fiber base layer are bound with a thermoplastic resin to provide rigidity to the fiber base layer, and function as reinforcing fibers in the fiber base layer.

A type of the fiber is not particularly limited. For example, inorganic fibers, organic fibers, or inorganic-organic composite fibers may be used.

Examples of the inorganic fibers include glass fibers, carbon fibers (e.g., PAN-based carbon fibers, pitch-based carbon fibers, and cellulose-based carbon fibers), metal fibers (e.g., aluminum fibers and stainless steel fibers), ceramic fibers (basalt fibers, silicon carbide fibers, and silicon nitride fibers), and the like.

Examples of the organic fibers include synthetic fibers, natural fibers, and the like. Examples of the synthetic fibers include polyester-based fibers, polyamide-based fibers (e.g., aramid fibers), polyolefin-based fibers, acrylic fibers, vinylon-based fibers, and the like. Examples of the natural fibers include plant-derived fibers and animal-derived fibers. Examples of the plant-derived fibers include plant-based fibers derived from various plants such as kenaf, Manila hemp, sisal, jute hemp, raw cotton, ganpi, *Edgeworthia chrysantha*, banana, pineapples, coconut palm, corn, sugarcane, bagasse, coconut, papyrus, reed, esparto, sabai grass, wheat, rice plant, bamboo, and conifers.

These fibers may be used either alone or in combination.

When inorganic fibers are used as the fibers, a surface of the fibers may be subjected to a surface treatment that improves affinity to a thermoplastic resin in order to improve bindability using the thermoplastic resin. Examples of the surface treatment include a coupling treatment (e.g., silane coupling treatment).

A length (fiber length) of the fibers is not particularly limited. The length is normally in a range from 1 to 100 mm, and preferably from 3 to 70 mm from the viewpoint of obtaining higher rigidity. It is more preferably from 3 to 50 mm from the viewpoint of basis weight control. A diameter (fiber diameter) of the fibers is not particularly limited. The diameter is normally in a range from 1 to 30 μm, and preferably from 5 to 25 μm from the viewpoint of obtaining higher rigidity. It is more preferably from 7 to 25 μm from the viewpoint of basis weight control.

Note that the term "fiber length" used herein refers to a value obtained by measuring the length of one fiber that has been randomly selected and is extended linearly in accordance with JIS L 1015 (direct method), and the term "fiber diameter" used herein refers to a value obtained by measuring the diameter of the center area (in the lengthwise direction) of the fiber subjected to the fiber length measurement using an optical microscope.

The thermoplastic resin in the fiber base layer functions as a binder for the fibers, and a type thereof is not particularly limited.

Examples of the thermoplastic resin include a polyolefin-based resin, a polyester-based resin, a polystyrene resin, a polyvinyl chloride resin, an acrylic-based resin, a polyamide-based resin, a polycarbonate-based resin, an ABS resin, a polyacetal-based resin, and the like. These thermoplastic resins may be used singly or in combination of two or more types thereof.

Examples of the polyolefin-based resin include a polyolefin resin such as polypropylene and polyethylene; an olefin-based copolymer such as an ethylene vinyl chloride copolymer and an ethylene vinyl acetate copolymer; a polyolefin-based thermoplastic elastomer such as an ethylene propylene copolymer and an ethylene propylene diene copolymer; a modified polyolefin-based resin that is modified with a carboxyl group or an acid anhydride group; and the like.

Examples of the polyester-based resin include an aliphatic polyester resin such as polylactic acid and polycaprolactone; and an aromatic polyester resin such as polyethylene terephthalate.

Examples of the polyacrylic-based resin include methacrylates, acrylates, and the like.

The fiber content in the fiber base layer is in a range from 20% to 70% by mass, preferably from 30% to 60% by mass, and more preferably from 30% to 50% by mass, based on 100% by mass of the fiber base layer. If the fiber content in the fiber base layer exceeds 70% by mass, the base may not exhibit sufficient transmittance, and sufficient illuminance may not be obtained when the base is used as a constituent part of an illumination apparatus. On the other hand, if the fiber content in the fiber base layer is less than 20% by mass, it may be difficult to provide sufficient flexural rigidity to the base, and the base may break during handling.

The orientation direction of the fibers included in the fiber base layer may be controlled. Specifically, the fiber base layer may have a configuration in which the fibers are oriented approximately in the planar direction of the fiber base layer, or may have a configuration in which the fibers are oriented in the thickness direction of the fiber base layer.

The fiber base layer may optionally include various additives. Examples of such additives include a blowing agent, an antioxidant, a UV absorber, a lubricant, a flame retardant, a flame retardant aid, a softener, an inorganic or organic filler that improves impact resistance, heat resistance, and the like of the fiber base layer, an antistatic agent, a coloring agent, a plasticizer, and the like.

A production method of the fiber base is not particularly limited. For example, when a web containing fibers and a thermoplastic resin body is heated to melt the thermoplastic resin body, and the thermoplastic resin is solidified in a state in which the fibers are bound by the melted thermoplastic resin, a fiber base can be obtained.

A production method of the web is not particularly limited. For example, the web may be produced by dispersing and mixing fibers and a thermoplastic resin body in a gas phase, and allowing a mixture of the fibers and the thermoplastic resin body to deposit downward (dry process). The web may also be produced by allowing fibers and a thermoplastic resin body to deposit in a liquid dispersion medium (wet process). Note that the web obtained by the dry process or the wet process may optionally be subjected to needling.

The base of the first invention may consist of only the fiber base layer, or may consist of the fiber base layer and an additional layer. The number of the additional layer is not particularly limited. The base may include only one additional layer, or may include two or more additional layers.

Examples of the additional layer include a skin layer, a nonwoven fabric layer (e.g., scrim layer), an air-barrier film layer (barrier film layer), an adhesive film layer, and the like. These additional layers may be provided singly or two or more layers may be provided.

Specific example of the base of the first invention include a base having sequentially a scrim layer, an air-barrier film layer, a fiber base layer, and an adhesive film layer; a base having sequentially a scrim layer, an air-barrier film layer, a fiber base layer, an adhesive film layer, and a skin layer; and the like.

In the first invention, the basis weight of the base is preferably in a range from 300 to 1,500 g/m², more preferably from 300 to 1,000 g/m², and further preferably from 400 to 600 g/m². If the basis weight of the base is less than 300 g/m², it may be difficult to provide sufficient flexural rigidity to the base, and the base may break during handling, for example. If the basis weight of the base exceeds 1,500 g/m², the base may not exhibit sufficient transmittance, and sufficient illuminance may not be obtained when the base is used as a constituent part of an illumination apparatus.

In the first invention, a thickness of the base is in a range from 1 to 10 mm, preferably from 1 to 8 mm, and more preferably from 1 to 6 mm. If the thickness of the base is less than 1 mm, it may be difficult to provide sufficient flexural rigidity to the base, and the base may break during handling, for example. If the thickness of the base exceeds 10 mm, it may be difficult to provide sufficient flexural rigidity to the base, and the base may not exhibit sufficient transmittance. As a result, sufficient illuminance may not be obtained when the base is used as a constituent part of an illumination apparatus of the second invention.

In the first invention, a transmittance (light transmittance) of the base measured using the following measurement method is in a range from 35% to 75%, preferably from 40% to 70%, and more preferably from 45% to 65%. If the transmittance of the base is less than 35%, sufficient illuminance may not be obtained when the base is used as a constituent part of an illumination apparatus of the second invention. If the transmittance of the base exceeds 75%, a light source or the like may be observed through the base when an illumination apparatus that includes the base is produced, and the external appearance of the illumination apparatus may be deteriorated. The transmittance of the base can be adjusted with a thickness of the base, a basis weight of the base, a fiber content in the base, and the like.

<Transmittance Measurement Method>

Figure 4:
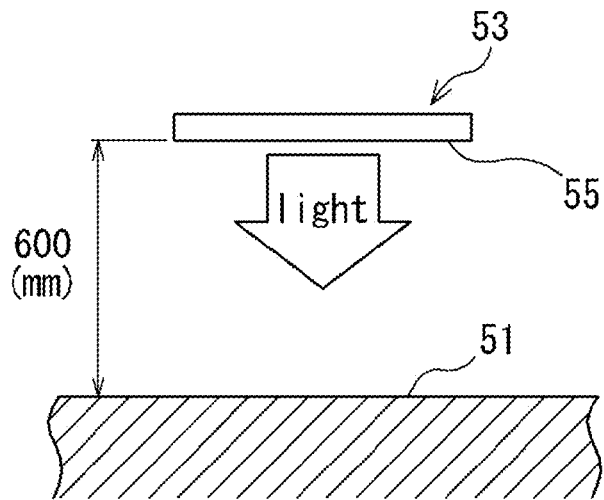
FIG. 4 is a view illustrating a base transmittance measurement method.
Figure 5:
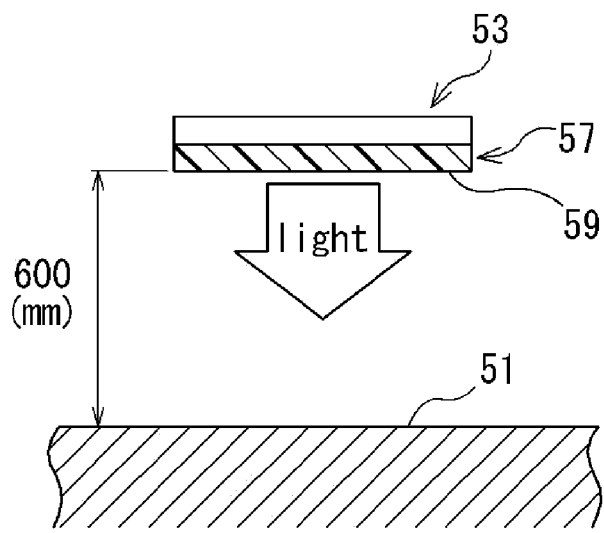
FIG. 5 is a view illustrating a base transmittance measurement method.

A surface-emitting light source 53 (100 mm×100 mm) that emits light equivalent to a luminous flux of 100 lumens is disposed above an irradiation target surface 51 at a distance of 600 mm from the irradiation target surface 51 so that the emitting surface 55 is parallel to the irradiation target surface 51 (temperature: 23° C., illuminance: 0.1 lux or less (darkroom)) (see FIG. 4). The surface-emitting light source 53 is turned on, and the illuminance at the irradiation target surface 51 is measured directly under the center of the surface-emitting light source 53 to obtain a measured value A. A laminate consisting of a base 57 (100 mm×100 mm) and the surface-emitting light source 53 (100 mm×100 mm) is disposed above the irradiation target surface 51 at a distance of 600 mm from the irradiation target surface 51 so that an emitting surface 59 of the base 57 is parallel to the irradiation target surface 51 (see FIG. 5). The surface-emitting light source 53 is turned on, and the illuminance at the irradiation target surface 51 is measured directly under the center of the surface-emitting light source 53 to obtain a measured value B. The transmittance is calculated by an equation:

$$[(B/A)\times 100(\%)].$$

2. Illumination Apparatus

The second invention is an illumination apparatus which includes the base of the first invention, and a light source that is provided on a back side of the base, and is characterized in that a light emitted from the light source passes through the base from the back side to a front side of the base.

A type of the light source is not particularly limited. Examples of the light source include a light-emitting diode (LED), an incandescent lamp, a fluorescent lamp, and the like. The light source may be used singly or in combination of two or more types thereof.

Since the illumination apparatus of the second invention is configured so that it is unnecessary to place the light source in the base, and the light source and the base can be independently assembled to a specific part, the illumination apparatus can be easily assembled (attached) and removed. Moreover, the assembly capability can be improved by utilizing a base in which a skin layer that serves as a design surface is integrated.

Since the illumination apparatus of the second invention can be easily assembled (attached) and removed, the illumination apparatus can be used in various fields. For example, the illumination apparatus can be used as an illumination apparatus for a ceiling, a wall surface, and the like in the fields of automobiles, rail vehicles, ships, airplanes, and the like. The illumination apparatus can also be used as an illumination apparatus in the fields of buildings, furniture, and the like.

In the second invention, the illumination apparatus may include a base 1 in which an additional layer 2 (a skin layer) that is formed using a surface material having a print area and a non-print area is disposed on one side of a fiber base layer 7 (hereinafter referred to as "illumination apparatus (L1)"). The illumination apparatus (L1) is configured so that light emitted from the light source when the light source is turned on projects the print area formed on the skin layer to form an image based on a design at the print area of the skin layer on a surface of the skin layer. The resulting image is clear, and provides excellent decorative properties at a time of using the illumination apparatus (L1).

It is preferable that the surface material has translucency. A nonwoven fabric, a woven fabric, a knitted fabric, or the like may be used as the surface material.

A design at the print area may be formed by printing such as relief printing, intaglio printing, offset printing, screen printing, and ink-jet printing. Examples of the design represented at the print area include characters, symbols, a pattern, a combination thereof, and the like.

A surface (design surface) of the other side (i.e., the side on which the print area is not provided) of the surface material may be plain, or may be provided with characters, symbols, a pattern, or the like formed by printing or the like. When a design (e.g., pattern) is formed on the surface (design surface) of the skin layer, an image can be combined with the image that appears when the light source is turned on.

In the illumination apparatus (L1), a difference DD1 in transmittance of the surface material for the skin layer calculated using the following calculation method is preferably in a range from 5% to 60%, more preferably from 10% to 55%, and further preferably from 15% to 50%. If the difference DD1 in transmittance of the surface material is less than 5%, the image (e.g., pattern) may not sufficiently appear on the surface (design surface) of the skin layer when the light source is turned on. On the other hand, if the difference DD1 in transmittance of the surface material exceeds 60%, the print area may be observed through the skin layer when the light source does not emit light, and the design properties of the illumination apparatus may deteriorate.

<Calculation of Difference DD1 in Transmittance>

Figure 8:
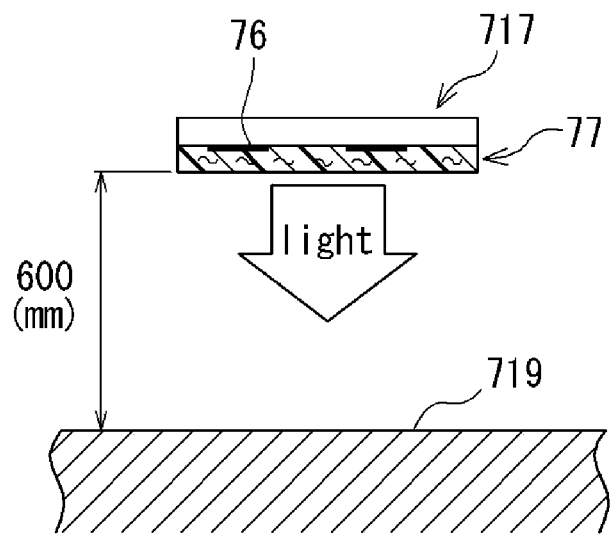
FIG. 8 is a view illustrating a difference-in-transmittance calculation method.

A surface-emitting light source 717 (100 mm×100 mm) that emits light equivalent to a luminous flux of 100 lumens is disposed on a back side (i.e., the side on which a print area 76 is formed) of the skin layer (surface material) 77, and an irradiation target surface 719 is disposed below the skin layer 77 at a distance of 600 mm from the irradiation target surface 719 so that the front side of the skin layer 77 is parallel to the irradiation target surface 719 (temperature: 23° C., illuminance: 0.1 lux or less (darkroom)) (see FIG. 8). The surface-emitting light source 717 is turned on to apply light to the irradiation target surface 719 positioned directly under the surface-emitting light source 717 through the non-print area, and the illuminance at the irradiation target surface 719 is measured to obtain a measured value X1. The surface-emitting light source 717 is then turned on to apply light to the irradiation target surface 719 positioned directly under the surface-emitting light source 717 through the print area 76, and the illuminance at the irradiation target surface 719 is measured to obtain a measured value Y1. The difference DD1 in transmittance is calculated by an equation:

$$[|(X1-Y1)/X1|\times 100(\%)].$$

Note that the equation $[|(X1-Y1)/X1|\times 100(\%)]$ may be expressed as $[((X1-Y1)/X1)\times 100(\%)]$ (where, X1>Y1) or $[((Y1-X1)/X1)\times 100(\%)]$ (where, Y1>X1).

In the illumination apparatus (L1), a basis weight of the skin layer is preferably in a range from 50 to 400 g/m$^2$, more preferably from 75 to 300 g/m$^2$, and further preferably from 100 to 200 g/m$^2$. When the basis weight of the skin layer is within the above range, the image based on a design due to the print area appears more clearly.

A thickness of the skin layer is preferably in a range from 0.5 to 5 mm, more preferably from 1 to 3 mm, and further preferably from 1 to 2 mm. When the thickness of the skin layer is within the above range, the image due to the print area appears more clearly.

In the second invention, the illumination apparatus may include a base 1 in which an additional layer 2 (air-barrier film layer) that is formed using a decorative air-barrier film is disposed on one side of a fiber base layer 7 (hereinafter referred to as "illumination apparatus (L2)"). The illumination apparatus (L2) is configured so that light emitted from the light source when the light source is turned on passes through the base 1 that includes the air-barrier film layer and the fiber base layer 7 to form the decorative pattern based on the air-barrier film on the surface of the illumination apparatus (L2).

Since the illumination apparatus (L2) includes the air-barrier film layer, passage of air through the entire illumination apparatus (L2) in the thickness direction is prevented or suppressed, and the amount of dust or the like that adheres to the design surface is reduced. Therefore, the external appearance of the illumination apparatus (L2) is maintained for a long time.

The air-barrier film layer may be formed using a film formed of a synthetic resin such as a polyolefin-based resin (e.g., polypropylene), a polyamide-based resin, and a polyester-based resin.

It is preferable that an adhesive layer is formed on one side or each side of the air-barrier film layer. In the case of using a laminate film, for example, consisting of a polyolefin resin layer and a polyamide resin layer, the polyolefin resin layer or the polyamide resin layer having a lower melting point may be used as the adhesive layer.

The decorative part of the air-barrier film (layer) may be formed by printing on a synthetic resin film, or may be an irregular part or the like formed on a synthetic resin film through a surface treatment. The decorative part may be a color decorative part formed by adding a pigment or the like when producing the film. It is preferable that the illumination apparatus (L2) has the air-barrier film layer that includes a decorative part formed by printing.

Examples of the printing method include relief printing, intaglio printing, offset printing, screen printing, ink jet printing, and the like.

A design represented at the print area is not particularly limited. Example thereof includes characters, symbols, a pattern, a combination thereof, and the like. When a design (e.g., pattern) is formed on the surface (design surface) of the illumination apparatus (L2), an image can be combined with the image that appears when the light source is turned on.

A thickness of the air-barrier film layer is not particularly limited. The thickness thereof is preferably in a range from 15 to 200 μm, more preferably from 30 to 100 μm, and more preferably from 30 to 70 μm.

The illumination apparatus (L2) may be an illumination apparatus that has a base 1 including an additional layer 2 (air-barrier film layer) formed using a decorative air-barrier film, a fiber base layer 7, and an additional layer 6 formed using a surface material, sequentially, and further a light source which is disposed on the side of the additional layer 2. It is preferable to use a nonwoven fabric, a woven fabric, a knitted fabric, or the like that has translucency as the surface material.

3. Interior Material

The third invention is an interior material that includes a translucent base, an illumination means which is provided on a back side of the translucent base, and a skin layer which is provided on a surface side of the translucent base.

In the interior material of the third invention, a type of the translucent base is not particularly limited as long as it has translucency. A material or the like for the translucent base may be appropriately selected according to the purpose thereof. The translucent base may be a transparent article that is formed of a transparent synthetic resin (e.g., acrylic resin, polycarbonate resin, poly vinyl chloride resin, polymethacrylimide resin, or polyester resin), a fiber base (hereinafter referred to as "fiber base (F)"), a urethane foam, or the like. Further, the translucent base may be prepared by providing an opaque solid member with translucency by forming a hole or the like. The transmittance (light transmittance) from one side to the other side of the translucent base is described later.

In the fiber base (F), the fibers are bound with a thermoplastic resin to provide rigidity.

A type of the fiber is not particularly limited. For example, inorganic fibers, organic fibers, or inorganic-organic composite fibers may be used.

Examples of the inorganic fibers include glass fibers, carbon fibers (e.g., PAN-based carbon fibers, pitch-based carbon fibers, and cellulose-based carbon fibers), metal fibers (e.g., aluminum fibers and stainless steel fibers), ceramic fibers (basalt fibers, silicon carbide fibers, and silicon nitride fibers), and the like.

Examples of the organic fibers include synthetic fibers, natural fibers, and the like. Examples of the synthetic fibers include polyester-based fibers, polyamide-based fibers (e.g., aramid fibers), polyolefin-based fibers, acrylic fibers, vinylon-based fibers, and the like. Examples of the natural fibers include plant-derived fibers and animal-derived fibers. Examples of the plant-derived fibers include plant-based fibers derived from various plants such as kenaf, Manila hemp, sisal, jute hemp, raw cotton, ganpi, *Edgeworthia chrysantha*, banana, pineapples, coconut palm, corn, sugarcane, bagasse, coconut, papyrus, reed, esparto, sabai grass, wheat, rice plant, bamboo, and conifers.

These fibers may be used either alone or in combination.

When inorganic fibers are used as the fibers, a surface of the fibers may be subjected to a surface treatment that improves affinity to a thermoplastic resin in order to improve bindability using the thermoplastic resin. Examples of the surface treatment include a coupling treatment (e.g., silane coupling treatment).

A length (fiber length) of the fibers is not particularly limited. The length is normally in a range from 1 to 100 mm, and preferably from 3 to 70 mm from the viewpoint of obtaining higher rigidity. It is more preferably from 3 to 50 mm from the viewpoint of basis weight control. A diameter (fiber diameter) of the fibers is not particularly limited. The diameter is normally in a range from 1 to 30 µm, and preferably from 5 to 25 µm, from the viewpoint of obtaining higher rigidity. It is more preferably from 7 to 25 µm, from the viewpoint of basis weight control.

Note that the term "fiber length" used herein refers to a value obtained by measuring the length of one fiber that has been randomly selected and is extended linearly in accordance with JIS L 1015 (direct method), and the term "fiber diameter" used herein refers to a value obtained by measuring the diameter of the center area (in the lengthwise direction) of the fiber subjected to the fiber length measurement using an optical microscope.

The thermoplastic resin in the fiber base (F) functions as a binder for the fibers, and a type thereof is not particularly limited.

Examples of the thermoplastic resin include a polyolefin-based resin, a polyester-based resin, a polystyrene resin, a polyvinyl chloride resin, an acrylic-based resin, a polyamide-based resin, a polycarbonate-based resin, an ABS resin, a polyacetal-based resin, and the like. These thermoplastic resins may be used singly or in combination of two or more types thereof.

Examples of the polyolefin-based resin include a polyolefin resin such as polypropylene and polyethylene; an olefin-based copolymer such as an ethylene vinyl chloride copolymer and an ethylene vinyl acetate copolymer; a polyolefin-based thermoplastic elastomer such as an ethylene propylene copolymer and an ethylene propylene diene copolymer; a modified polyolefin-based resin that is modified with a carboxyl group or an acid anhydride group; and the like.

Examples of the polyester-based resin include an aliphatic polyester resin such as polylactic acid and polycaprolactone; and an aromatic polyester resin such as polyethylene terephthalate.

Examples of the polyacrylic-based resin include methacrylates, acrylates, and the like.

The fiber content in the fiber base (F) is preferably in a range from 20% to 70% by mass, more preferably from 30% to 60% by mass, and further preferably from 30% to 50% by mass, based on 100% by mass of the fiber base (F). When the fiber content is within the above range, sufficient transmittance and sufficient flexural rigidity can be obtained.

The orientation direction of the fibers included in the fiber base (F) may be controlled. Specifically, the fiber base (F) may have a configuration in which the fibers are oriented approximately in the planar direction of the fiber base, or may have a configuration in which the fibers are oriented in the thickness direction of the fiber base.

The fiber base (F) may optionally include various additives. Examples of such additives include a blowing agent, an antioxidant, a UV absorber, a lubricant, a flame retardant, a flame retardant aid, a softener, an inorganic or organic filler that improves impact resistance, heat resistance, and the like of the fiber base layer, an antistatic agent, a coloring agent, a plasticizer, and the like.

A production method of the fiber base (F) is not particularly limited. For example, when a web containing fibers and a thermoplastic resin body is heated to melt the thermoplastic resin body, and the thermoplastic resin is solidified in a state in which the fibers are bound by the melted thermoplastic resin, a fiber base (F) can be obtained.

A production method of the web is not particularly limited. For example, the web may be produced by dispersing and mixing fibers and a thermoplastic resin body in a gas phase, and allowing a mixture of the fibers and the thermoplastic resin body to deposit downward (dry process). The web may also be produced by allowing fibers and a thermoplastic resin body to deposit in a liquid dispersion medium (wet process). Note that the web obtained by the dry process or the wet process may optionally be subjected to needling.

The translucent base in the interior material of the third invention may consist of only the above translucent member, or may include an additional layer such as a nonwoven fabric layer (e.g., scrim layer), an air-barrier film layer (barrier film layer), and an adhesive film layer. The number of the additional layer is not particularly limited. The translucent base may include only one additional layer, or may include two or more additional layers.

Figure 7:
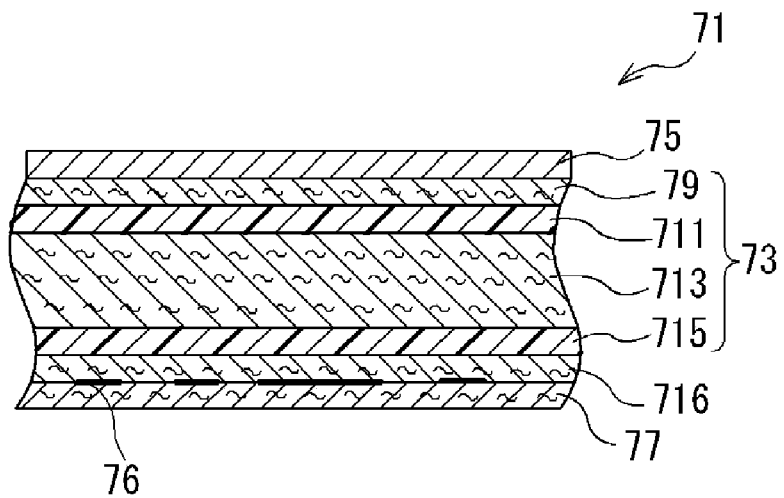
FIG. 7 is a schematic cross-sectional view illustrating an example of the interior material according to the third aspect of the invention.

Specific examples of the translucent base according to the third invention include a translucent base 73 having sequentially a scrim layer 79, an air-barrier film layer 711, a fiber base layer 713 that is formed of a fiber base (F), and an adhesive film layer 715 (see FIG. 7).

A basis weight of the translucent base is not particularly limited. The basis weight thereof is preferably in a range from 300 to 1,500 g/m$^2$, more preferably from 300 to 1,000 g/m$^2$, and further preferably from 400 to 600 g/m$^2$. When the basis weight of the translucent base is within the above range, sufficient transmittance and sufficient flexural rigidity can be obtained.

A thickness of the translucent base is not particularly limited. The thickness is preferably in a range from 1 to 10 mm, more preferably from 1 to 8 mm, and further preferably from 1 to 6 mm. When the thickness of the translucent base is within the above range, sufficient transmittance and sufficient flexural rigidity can be obtained.

A transmittance (light transmittance) of the translucent base measured using the following measurement method is preferably in a range from 35% to 75%, more preferably from 40% to 70%, and further preferably from 45% to 65%. When the transmittance of the translucent base is within the above range, sufficient illuminance can be obtained.

<Transmittance Measurement Method>

Figure 9:
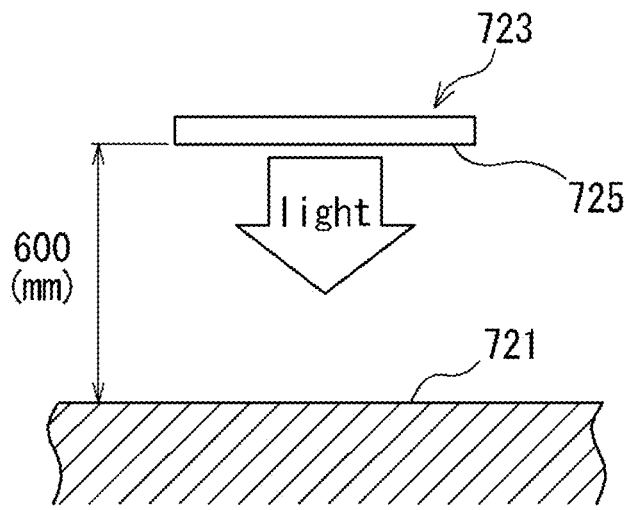
FIG. 9 is a view illustrating a transmittance measurement method.
Figure 10:
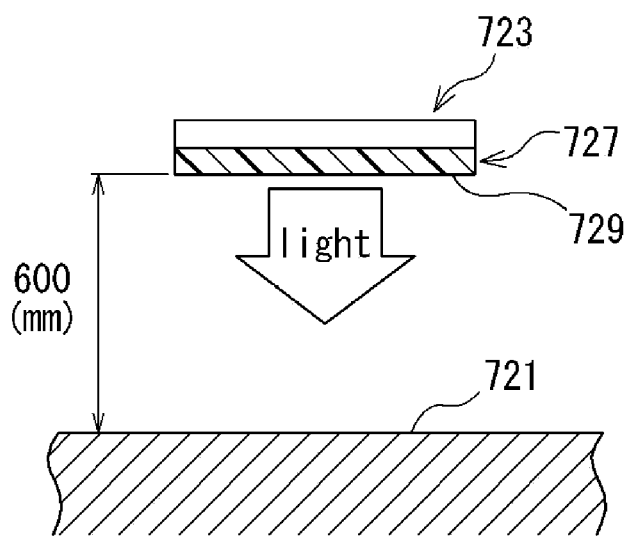
FIG. 10 is a view illustrating a transmittance measurement method.

A surface-emitting light source 723 (100 mm×100 mm) "UniBrite" manufactured by Opto Design Inc. that emits light equivalent to a luminous flux of 100 lumens is disposed above an irradiation target surface 721 at a distance of 600 mm from the irradiation target surface 721 so that the emitting surface 725 is parallel to the irradiation target surface 721 (temperature: 23° C., illuminance: 0.1 lux or less (darkroom)) (see FIG. 9). The surface-emitting light source 723 is turned on, and the illuminance at the irradiation target surface 721 is measured directly under the center of the surface-emitting light source 723 to obtain a measured value a. A laminate consisting of a translucent base 727 (100 mm×100 mm) and the surface-emitting light source 723 (100 mm×100 mm) is disposed above the irradiation target surface 721 at a distance of 600 mm from the irradiation target surface 721 so that an emitting surface 729 of the translucent base 727 is parallel to the irradiation target surface 721 (see FIG. 10). The surface-emitting light source 723 is turned on, and the illuminance at the irradiation target surface 721 is measured directly under the center of the surface-emitting light source 723 to obtain a measured value b. The transmittance is calculated by an equation:

$$[(b/a)\times 100(\%)].$$

In the interior material of the third invention, the skin layer is disposed on one side of the translucent base, and forms a design surface of the interior material. As illustrated in FIG. 7, a print area (decorative part) 76 and a non-print area are formed on the back side (i.e., the side adjacent to the translucent base 73) of the skin layer 77. When the illumination means is turned on, light emitted from the illumination means passes through the translucent base 73 and the non-print area, and an image based on a design at the print area 76 appears on the surface of the skin layer 77 (i.e., the surface of the interior material 71).

It is preferable that the skin layer has translucency, and a nonwoven fabric, a woven fabric, a knitted fabric, or the like may be used as a material for forming the skin layer.

The print area may be formed by printing method such as relief printing, intaglio printing, offset printing, screen printing and ink-jet printing. A design represented at the print area is not particularly limited. Example thereof includes characters, symbols, a pattern, a combination thereof, and the like.

The surface of the skin layer may be plain, or may be provided with a design such as characters, symbols and a pattern, formed by printing or the like. When a design (e.g., pattern) is formed on the surface (design surface) of the skin layer, an image can be combined with the image that appears when the illumination means is turned on.

A difference DD2 in transmittance of the skin layer (surface material) calculated using the following calculation method is in a range from 5% to 60%, preferably from 10% to 55%, and more preferably from 15% to 50%. If the difference DD2 in transmittance is less than 5%, the design (e.g., pattern) may not sufficiently appear on the surface (design surface) of the skin layer when the light source is turned on. On the other hand, if the difference DD2 in transmittance exceeds 60%, the print area of the skin layer may be observed through the surface of the interior material when the illumination means does not emit light, and the design properties of the interior material may deteriorate.

<Calculation of Difference DD2 in Transmittance>

A surface-emitting light source 717 (100 mm×100 mm) that emits light equivalent to a luminous flux of 100 lumens is disposed on a back side (i.e., the side on which a print area 76 is formed) of the skin layer (surface material) 77, and an irradiation target surface 719 is disposed below the skin layer 77 at a distance of 600 mm from the irradiation target surface 719 so that the surface of the skin layer 77 is parallel to the irradiation target surface 719 (temperature: 23° C., illuminance: 0.1 lux or less (darkroom)) (see FIG. 8). The surface-emitting light source 717 is turned on to apply light to the irradiation target surface 719 positioned directly under the surface-emitting light source 717 through the non-print area, and the illuminance at the irradiation target surface 719 is measured to obtain a measured value X2. The surface-emitting light source 717 is then turned on to apply light to the irradiation target surface 719 positioned directly under the surface-emitting light source 717 through the print area 76, and the illuminance at the irradiation target surface 719 is measured to obtain a measured value Y2. The difference DD2 in transmittance is calculated by an equation:

$$[|(X2-Y2)/X2|\times 100(\%)].$$

Note that the equation $[|(X2\times Y2)/X2|\times 100(\%)]$ may be expressed as $[((X2-Y2)/X2)\times 100(\%)]$ (where, X2>Y2) or $[((Y2\times X2)/X2)\times 100(\%)]$ (where, Y2>X2).

A basis weight of the skin layer is not particularly limited. The basis weight thereof is preferably in a range from 50 to 400 g/m², more preferably from 75 to 300 g/m², and further preferably from 100 to 200 g/m². When the basis weight of the skin layer is within the above range, the image based on a design at the print area appears more clearly.

A thickness of the skin layer is not particularly limited. The thickness thereof is preferably in a range from 0.5 to 5 mm, more preferably from 1 to 3 mm, and further preferably from 1 to 2 mm. When the thickness of the skin layer is within the above range, the image due to the print area appears more clearly.

In the interior material of the third invention, the illumination means is disposed on the side of the translucent base opposite to the skin layer. When the illumination means is driven, light emitted from the illumination means passes through the translucent base and the non-print area formed on the skin layer.

The illumination means may utilize artificial light, or may utilize natural light (e.g., sunlight or moonlight). The configuration of the illumination means is not particularly limited.

When the illumination means utilizes artificial light, the illumination means may utilize a light source such as a light-emitting diode (LED), an incandescent lamp, or a fluorescent lamp. These light sources may be used either alone or in combination.

When the illumination means utilizes natural light, the illumination means may include a condenser member that condenses sunlight or the like, and a light-guiding member, for example.

The interior material of the third invention is configured so that a design formed on the inner side of the skin layer appears when the illumination means is driven (i.e., turned on). Since the interior material can be produced using a forming press for mass production, the interior material can be used as an interior material in various fields. For example, the interior material can be used as an interior material used for a ceiling, a wall surface, and the like in the fields of automobiles, rail vehicles, ships, airplanes, and the like. The interior material can also be used as an interior material used in the fields of buildings, furniture, and the like.

4. Vehicular Interior Material

The fourth invention is a vehicular interior material that includes a translucent base, an air-barrier film layer which is disposed on the back side of the translucent base, and an illumination means which is disposed on the back side of the air-barrier film layer.

In the vehicular interior material of the fourth invention, a type of the translucent base is not particularly limited as long as it has translucency. A material or the like for the translucent base may be appropriately selected according to the purpose thereof. The translucent base may be a transparent article that is formed of a transparent synthetic resin (e.g., acrylic resin, polycarbonate resin, poly vinyl chloride resin, polymethacrylimide resin, or polyester resin), a fiber base, a urethane foam, or the like. Further, the translucent base may be prepared by providing an opaque solid member with translucency by forming a hole or the like. The transmittance (light transmittance) from one side to the other side of the translucent base is described later.

It is preferable to use a fiber base, a urethane foam, a resin foam base, or the like that exhibit an excellent sound-absorbing capability as the translucent base included in the vehicular interior material of the fourth invention.

The fiber base (F) according to the third invention may be applied as the fiber base.

The translucent base in the vehicular interior material of the fourth invention may consist of only the above translucent member, or may include an additional layer such as a nonwoven fabric layer, an adhesive film layer, and a skin layer. The number of the additional layer is not particularly limited. The translucent base may include only one additional layer, or may include two or more additional layers. A decoration may be formed on one side or each side of the additional layer.

A basis weight of the translucent base is not particularly limited. The basis weight thereof is preferably in a range from 300 to 1,500 g/m$^2$, more preferably from 300 to 1,000 g/m$^2$, and further preferably from 400 to 600 g/m$^2$. When the basis weight of the translucent base is within the above range, sufficient transmittance and sufficient flexural rigidity can be obtained.

A thickness of the translucent base is not particularly limited. The thickness is preferably in a range from 1 to 10 mm, more preferably from 1 to 8 mm, and further preferably from 1 to 6 mm. When the thickness of the translucent base is within the above range, sufficient transmittance and sufficient flexural rigidity can be obtained.

A transmittance (light transmittance) of the translucent base measured using the following measurement method is preferably in a range from 35% to 75%, more preferably from 40% to 70%, and further preferably from 45% to 65%. When the transmittance of the translucent base is within the above range, sufficient illuminance can be obtained.

<Transmittance Measurement Method>

A surface-emitting light source 723 (100 mm×100 mm) "UniBrite" manufactured by Opto Design Inc. that emits light equivalent to a luminous flux of 100 lumens is disposed above an irradiation target surface 721 at a distance of 600 mm from the irradiation target surface 721 so that the emitting surface 725 is parallel to the irradiation target surface 721 (temperature: 23° C., illuminance: 0.1 lux or less (darkroom)) (see FIG. 9). The surface-emitting light source 723 is turned on, and the illuminance at the irradiation target surface 721 is measured directly under the center of the surface-emitting light source 723 to obtain a measured value a. A laminate consisting of a translucent base 727 (100 mm×100 mm) and the surface-emitting light source 723 (100 mm×100 mm) is disposed above the irradiation target surface 721 at a distance of 600 mm from the irradiation target surface 721 so that an emitting surface 729 of the translucent base 727 is parallel to the irradiation target surface 721 (see FIG. 10). The surface-emitting light source 723 is turned on, and the illuminance at the irradiation target surface 721 is measured directly under the center of the surface-emitting light source 723 to obtain a measured value b. The transmittance is calculated by an equation:

$$[(b/a)\times 100(\%)]$$

In the vehicular interior material of the fourth invention, the air-barrier film is disposed between the translucent base and the illumination means. The air-barrier film layer prevents or suppresses passage of air through the entire vehicular interior material in the thickness direction, and the amount of dust or the like that adheres to the design surface is reduced. Therefore, the design properties of the vehicular interior material are maintained.

The air-barrier film layer may be formed using a film formed of a synthetic resin such as a polyolefin-based resin (e.g., polypropylene), a polyamide-based resin, and a polyester-based resin.

It is preferable that an adhesive layer be formed on one side or each side of the air-barrier film layer. The air-barrier film layer on which an adhesive layer is formed may be formed of a laminate film consisting of, for example, a polyolefin resin layer and a polyamide resin layer, and the polyolefin resin layer or the polyamide resin layer having a lower melting point may be used as the adhesive layer.

The air-barrier film layer is decorated. When the illumination means is turned on, light emitted from the illumination means passes through the air-barrier film and the translucent base, and an image based on the decoration of the air-barrier film layer appears on the surface of the vehicular interior material.

The decorative part of the air-barrier film layer may be formed by printing on a synthetic resin film, or may be an irregular part or the like formed on a synthetic resin film through a surface treatment. The decorative part may be a color decorative part formed by adding a pigment or the like when producing the film. It is preferable that the decorative part is formed by printing.

Examples of the printing method include relief printing, intaglio printing, offset printing, screen printing, ink-jet printing, and the like.

A design represented at the print area is not particularly limited. Example thereof includes characters, symbols, a pattern, a combination thereof, and the like. When a design (e.g., pattern) is formed on the design surface of the vehicular interior material of the fourth invention, an image can be combined with the image that appears when the illumination means is turned on.

A thickness of the air-barrier film layer is preferably in a range from 15 to 200 μm more preferably 30 to 100 μm, and further preferably 30 to 70 μm.

In the vehicular interior material of the fourth invention, the illumination means is disposed on the side of the air-barrier film layer opposite to the translucent base. When the illumination means is driven, light emitted from the illumination means passes through the translucent base and the non-print area formed on the air-barrier film layer.

The configuration of the illumination means is not particularly limited. Examples of the illumination means include an illumination means that utilizes a light source such as light-emitting diode (LED), an incandescent lamp, and a fluorescent lamp. The light source may be used singly or in combination of two or more types thereof.

Since the air-barrier film included in the vehicular interior material of the fourth invention is decorated, an image based on the design (e.g., pattern) that cannot be observed when the illumination means does not emit light can be caused to appear on the design surface using a simple configuration by causing the illumination means to emit light. Therefore, the vehicular interior material of the fourth invention can be widely used in the field of vehicular interior materials (e.g., automotive interior materials).

EXAMPLES

The invention is further described below by way of examples.

[1] Base

(1-1) Configuration of Base

Example 1-1

A base 1 sequentially including a scrim layer 3, an air-barrier film layer 5, a fiber base layer 7, and an adhesive film layer 9 (see FIG. 1) was produced.

The scrim layer 3 was formed using a spunbond nonwoven fabric.

The air-barrier film layer 5 was formed using a laminate film consisting of a polyamide (PA) layer and a polypropylene (PP) layer. The air-barrier film layer 5 was provided so that the PA layer was positioned on the side of the scrim layer 3.

The fiber base layer 7 was formed using a fiber base that was produced using fibers (glass fibers), a thermoplastic resin (polypropylene), and a blowing agent. The fiber content in the fiber base layer 7 is 35% by mass based on 100% by mass of the fiber base layer 7.

The adhesive film layer 9 was formed using a polypropylene (PP) film.

The base 1 produced in Example 1-1 had a basis weight of 505 g/m$^2$ (scrim layer 3: 15 g/m$^2$, air-barrier film layer 5: 60 g/m$^2$, fiber base layer 7: 400 g/m$^2$, adhesive film layer 9: 30 g/m$^2$), and a thickness of 5 mm (see Table 1).

Examples 1-2 to 1-6

Bases for Examples 1-2 to 1-6 having the same configuration as that of Example 1-1, and having the basis weight and thickness shown in Table 1 were produced in the same manner as in Example 1-1, except that the fiber content in the fiber base layer was changed, and the blowing agent was optionally used. Note that the base produced in Example 1-6 had a basis weight of 1,000 g/m$^2$ (scrim layer 3: 15 g/m$^2$, air-barrier film layer 5: 45 g/m$^2$, fiber base layer 7: 910 g/m$^2$, adhesive film layer 9: 30 g/m$^2$).

Comparative Example 1-1

Figure 2:
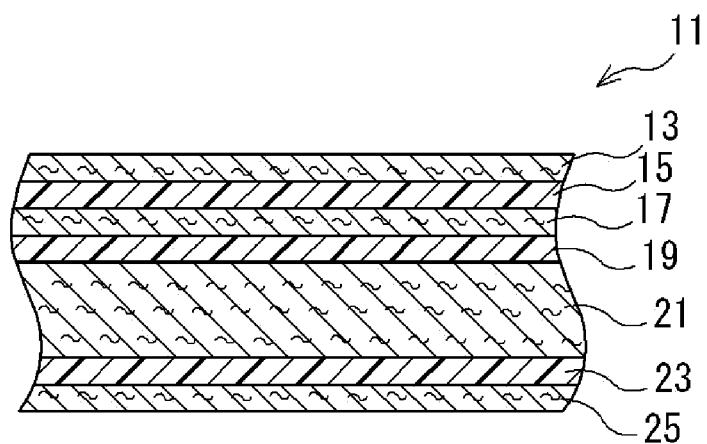
FIG. 2 is a schematic cross-sectional view illustrating the base of Comparative Example 1-1.

A base 11 sequentially including a scrim layer 13, an air-barrier film layer 15, a glass fiber layer 17, a diphenylmethane isocyanate adhesive layer 19, a urethane foam layer 21, a diphenylmethane isocyanate adhesive layer 23, and a glass fiber layer 25 (see FIG. 2) was produced.

The scrim layer 13 was formed using a spunbond nonwoven fabric.

The air-barrier film layer 15 was formed using a laminate film consisting of a polyethylene terephthalate (PET) layer, a polypropylene (PP) layer, and a nonoriented polypropylene (CPP) layer. The air-barrier film layer 15 was provided so that the PET layer was positioned on the side of the scrim layer 13.

The glass fiber layers 17 and 25 were formed using a glass fiber mat.

The urethane foam layer 21 was formed using a polyol-isocyanate foam.

The base 11 produced in Comparative Example 1-1 had a basis weight of about 500 g/m$^2$ (scrim layer 13: 15 g/m$^2$, air-barrier film layer 15: 45 g/m$^2$, glass fiber layer 17: 135 g/m$^2$, diphenylmethane isocyanate adhesive layer 19: 22 g/m$^2$, urethane foam layer 21: 127 g/m$^2$, diphenylmethane isocyanate adhesive layer 23: 22 g/m$^2$, glass fiber layer 25: 135 g/m$^2$), and a thickness of 5 mm.

Comparative Example 1-2

Figure 3:
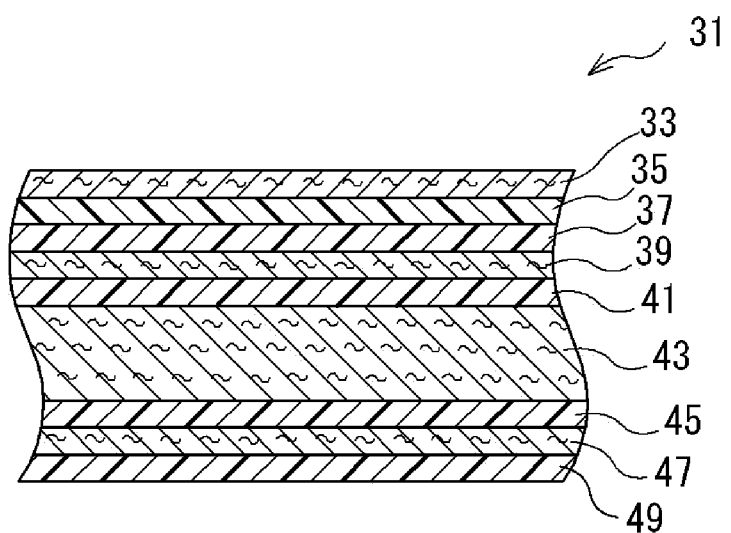
FIG. 3 is a schematic cross-sectional view illustrating the base of Comparative Example 1-2.

A base 31 sequentially including a scrim layer 33, an air-barrier film layer 35, an adhesive film layer 37, a glass fiber layer 39, an adhesive film layer 41, a urethane foam layer 43, an adhesive film layer 45, a glass fiber layer 47, and an adhesive film layer 49 (see FIG. 3) was produced.

The scrim layer 33 was formed using a spunbond nonwoven fabric.

The air-barrier film layer 35 was formed using a laminate film consisting of a polyamide (PA) layer and a polypropylene (PP) layer. The air-barrier film layer 35 was provided so that the PA layer was positioned on the side of the scrim layer 33.

The adhesive film layers 37, 41, 45, and 49 were formed using a polyolefin (PO) film.

The glass fiber layers 39 and 47 were formed using a glass fiber mat.

The urethane foam layer 43 was formed using a polyol-isocyanate foam.

The base 31 produced in Comparative Example 1-2 had a basis weight of 850 g/m$^2$ (scrim layer 33: 34 g/m$^2$, air-barrier film layer 35: 60 g/m$^2$, adhesive film layer 37: 30 g/m$^2$, glass fiber layer 39: 92 g/m$^2$, adhesive film layer 41: 77 g/m$^2$, urethane foam layer 43: 300 g/m$^2$, adhesive film layer 45: 87 g/m$^2$, glass fiber layer 47: 130 g/m$^2$, adhesive film layer 49: 40 g/m$^2$), and a thickness of 5 mm.

TABLE 1

| | | Example | | | | | | Comparative Example | |
|---|---|---|---|---|---|---|---|---|---|
| | | 1-1 | 1-2 | 1-3 | 1-4 | 1-5 | 1-6 | 1-1 | 1-2 |
| Configuration of fiber base layer | Fiber content (% by mass) | 35 | 45 | 35 | 35 | 45 | 45 | Urethane foam | Urethane foam |
| | Blowing agent | Used | Used | Used | Not used | Not used | Not used | | |
| Basis weight (g/m$^2$) of base | | 505 | 505 | 505 | 505 | 505 | 1000 | 490 | 850 |
| Thickness (mm) of base | | 5 | 5 | 5 | 3 | 3 | 3 | 5 | 5 |
| Transmittance (%) of base | | 42.8 | 48.8 | 51.1 | 81.6 | 79.2 | 47.5 | 38.4 | 23.8 |
| | | 1 | 1 | 1 | 1 | 1 | 1 | 3 | 3 |
| Flexural rigidity (N/cm) of base | Vertical | 25.9 | 54.1 | 15.1 | 7.0 | 12.0 | 23.1 | 53.6 | 97.0 |
| | Horizontal | 18.4 | 21.4 | 11.3 | 5.9 | 5.7 | 29.0 | 45.7 | 100.1 |
| | Average | 22.2 | 37.7 | 13.2 | 6.5 | 8.8 | 26.1 | 49.6 | 98.6 |
| | Determination | 1 | 1 | 2 | 2 | 2 | 1 | 1 | 1 |

(1-2) Measurement of Transmittance

The transmittance of the bases produced in Examples 1-1 to 1-6 and Comparative Examples 1-1 and 1-2 was measured using the following method. The results are shown in Table 1.

A surface-emitting light source 53 (100 mm×100 mm) "UniBrite" manufactured by Opto Design Inc. that emits light equivalent to a luminous flux of 100 lumens was disposed above an irradiation target surface 51 at a distance of 600 mm from the irradiation target surface 51 so that the emitting surface 55 was parallel to the irradiation target surface 51 (temperature: 23° C., illuminance: 0.1 lux or less (darkroom)) (see FIG. 4). After that, the surface-emitting light source 53 was turned on, and the illuminance at the irradiation target surface 51 was measured directly under the center of the surface-emitting light source 53 to obtain a measured value A. Subsequently, a laminate consisting of a base 57 (100 mm×100 mm) obtained in Examples 1-1 to 1-6 and Comparative Examples 1-1 and 1-2 and the surface-emitting light source 53 was disposed above the irradiation target surface 51 at a distance of 600 mm from the irradiation target surface 51 so that an emitting surface 59 of the base 57 was parallel to the irradiation target surface 51 under the same conditions as above (see FIG. 5). The surface-emitting light source 53 was turned on and the illuminance at the irradiation target surface 51 was measured directly under the center of the surface-emitting light source 53 to obtain a measured value B. The transmittance was calculated by an equation of [(B/A)×100 (%)], and evaluated in accordance with the following criteria.
"1": The transmittance was 45% to 75%.
"2": The transmittance was 35% or more and less than 45%.
"3": The transmittance was less than 35%.

(1-3) Evaluation of Flexural Rigidity

The flexural modulus gradient of the bases produced in Examples 1-1 to 1-6 and Comparative Examples 1-1 and 1-2 was measured using the following method to evaluate the flexural rigidity. The results are shown in Table 1.
A sample (50 mm×150 mm) was prepared from each of the bases produced in Examples 1-1 to 1-6 and Comparative Examples 1-1 and 1-2, and placed on a bend tester. A load was applied to the upper surface (i.e., the surface situated on the side of the skin layer) of the sample at a rate of 50 mm/min, and the flexural modulus gradient (N/cm) was calculated from the initial slope of the resulting load-deflection curve. The flexural rigidity was evaluated based on the average value of ten measured values in accordance with the following criteria.
"1": The flexural modulus gradient (mean) was 20 N/cm or more.
"2": The flexural modulus gradient (mean) was 5 N/cm or more and less than 20 N/cm.
"3": The flexural modulus gradient (mean) was less than 5 N/cm.

(1-4) Effects of Examples

Clearly from the results in Table 1, the base 11 produced in Comparative Example 1-1 and the base 31 produced in Comparative Example 1-2 exhibited excellent flexural rigidity, but exhibited insufficient transmittance.
In contrast, the bases 1 produced in Examples 1-1 to 1-6 exhibited a higher transmittance and excellent flexural rigidity.

[2] Illumination Apparatus

Example 1-7

(2-1) Configuration of Illumination Apparatus

Figure 6:
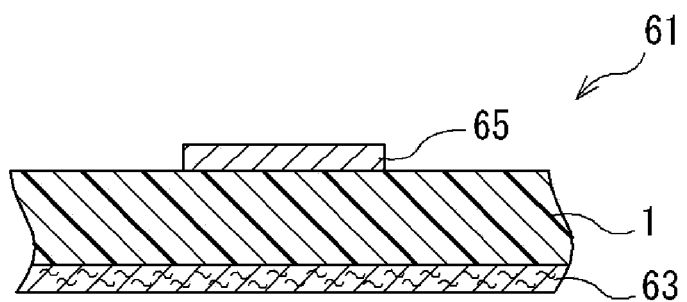
FIG. 6 is a view schematically illustrating an example of the illumination apparatus according to the second aspect of the invention.

An illumination apparatus 61 in Example 1-7 is used for vehicular ceiling transmissive illumination. As illustrated in FIG. 6, the illumination apparatus 61 included a base layer 1 formed using the base 1 produced in Example 1-1, a skin layer 63 provided on the front side (interior side) of the base layer 1, and a light source (LED light source) 65 provided at a predetermined position of the back side (ceiling side) of the base layer 1.
The skin layer 63 was formed using a surface material including PET fibers. When the illumination apparatus 61 was produced, the surface material was integrally formed with the base layer 1 in advance so that the surface material was bonded to the adhesive film layer 9 illustrated in FIG. 1.

(2-2) Effects of Illumination Apparatus

According to the illumination apparatus 61 produced in Example 1-7 that includes the light source 65, and the base layer 1 having a transmittance within a specific range, a light emitted from the light source 65 passes through the base layer 1 from the back side (ceiling side) to the front side (interior side) to illuminate the interior of a vehicle. Specifically, the light emitted from the light source 65 can be applied to the interior of a vehicle through the base layer 1. Since the illumination apparatus 61 is configured so that it is unnecessary to provide the light source 65 in the base layer 1, and the light source 65 and the base layer 1 can be independently assembled to a specific part, the illumination apparatus 61 can be easily assembled (attached) and removed. Moreover, the assembly capability can be improved by integrally forming the base layer 1 and the skin layer 63.

[3] Interior Material

Examples 2-1 to 2-8

(3-1) Configuration of Interior Material

Interior materials 71 in Examples 2-1 to 2-8 are used as a vehicular ceiling interior material. As illustrated in FIG. 7, the interior material 71 sequentially included a skin layer 77, a strike through-prevention nonwoven fabric layer 716, a translucent base layer 73, and an illumination means 75.
The translucent base layer 73 was formed using a multi-layer structure sequentially including a scrim layer 79, an air-barrier film layer 711, a fiber base layer 713, and an adhesive film layer 715, and having a transmittance measured by the above method (see (1-2)) of 45%.
The scrim layer 79 was formed using a spunbond nonwoven fabric.
The air-barrier film layer 711 was formed using a laminate film consisting of a polyamide (PA) layer and a polypropylene (PP) layer. The air-barrier film layer 711 was provided so that the PA layer was positioned on the side of the scrim layer 79.
The fiber base layer 713 was formed using a fiber base that was produced using fibers (glass fibers), a thermoplastic resin (polypropylene), and a blowing agent. The fiber content in the fiber base layer 713 is 35% by mass based on 100% by mass of the fiber base layer 713.
The adhesive film layer 715 was foamed using a polypropylene (PP) film.
The translucent base layer 73 had a basis weight of 505 g/m$^2$ (scrim layer 79: 15 g/m$^2$, air-barrier film layer 711: 60 g/m$^2$, fiber base layer 713: 400 g/m$^2$, adhesive film layer 715: 30 g/m$^2$), and a thickness of 5 mm.
The illumination means 75 was formed using a surface-emitting luminous body (light source: LED).

The skin layer 77 was formed using a surface material including PET fibers, and having a print area 76 (formed by screen printing) and a non-print area on one side. The surface material was integrally formed with the translucent base layer 73 through the strike through-prevention nonwoven fabric layer 716 using a forming press for mass production so that the surface material was bonded to the adhesive film layer 715. The surface material was used so that the side having the print area 76 was bonded to the strike through-prevention nonwoven fabric layer 716.

The print area 76 was formed on the skin layer 77 of each interior material 71 (Examples 2-1 to 2-8) at a different print density. Table 2 shows the difference DD2(%) in transmittance between the print area 76 and the non-print area of each interior material 71.

Calculation of Difference DD2 in Transmittance

A surface-emitting light source 717 (100 mm×100 mm) "UniBrite" manufactured by Opto Design Inc. that emits light equivalent to a luminous flux of 100 lumens was disposed on a back side (i.e., the side on which a print area 76 is formed) of the surface material 77, and then an irradiation target surface 719 was disposed below the skin layer 77 at a distance of 600 mm from the irradiation target surface 719 so that the surface of the skin layer 77 was parallel to the irradiation target surface 719 (temperature: 23° C., illuminance: 0.1 lux or less (darkroom)) (see FIG. 8). After that, the surface-emitting light source 717 was turned on to apply light to the irradiation target surface 719 positioned directly under the surface-emitting light source 717 through the non-print area, and the illuminance at the irradiation target surface 719 was measured to obtain a measured value X2. Subsequently, the surface-emitting light source 717 was turned on to apply light to the irradiation target surface 719 positioned directly under the surface-emitting light source 717 through the print area 76, and the illuminance at the irradiation target surface 719 was measured to obtain a measured value Y2. The difference DD2 in transmittance was calculated by an equation of $[|(X2-Y2)/X2 \times 100(\%)|]$.

Note that the center illuminance when applying light from the surface-emitting light source 717 without providing the surface material 77 was 12.84 1x. In this case, the distance from the emitting surface of the surface-emitting light source 717 to the irradiation target surface 719 was set to 600 mm.

design properties were evaluated taking account of the observation results when light was not emitted. The results are shown in Table 2.

"1": The image appeared on the surface of the skin layer, and could be clearly observed when light was emitted from the illumination means, and was not observed when light was not emitted from the illumination means.

"2": (1) The image appeared on the surface of the skin layer, and could be observed when light was emitted from the illumination means, and was not observed when light was not emitted from the illumination means, or (2) the image appeared on the surface of the skin layer, and could be clearly observed when light was emitted from the illumination means, and was vaguely observed when light was not emitted from the illumination means.

"3": (1) The image appeared on the surface of the skin layer, and could be observed when light was emitted from the illumination means, and was clearly observed when light was not emitted from the illumination means, or (2) the image could not be observed when light was emitted from the illumination means.

As shown in Table 2, in the case of the interior materials of Examples 2-1 to 2-8 in which the difference DD2 in transmittance was 7.7 to 47.7%, the appeared image on the surface of the skin layer could be observed when light was emitted from the illumination means, and was not observed when light was not emitted from the illumination means (i.e., "1" or "2").

It was thus confirmed that the interior material according to the present invention allowed the design (e.g., pattern) that is not observed when the illumination means does not emit light to appear on the surface (front side) of the skin layer when the illumination means emits light, and can improve the interior atmosphere.

[4] Vehicular Interior Material

Examples 3-1 and 3-2

(4-1) Configuration of Vehicular Interior Material

Figure 11:
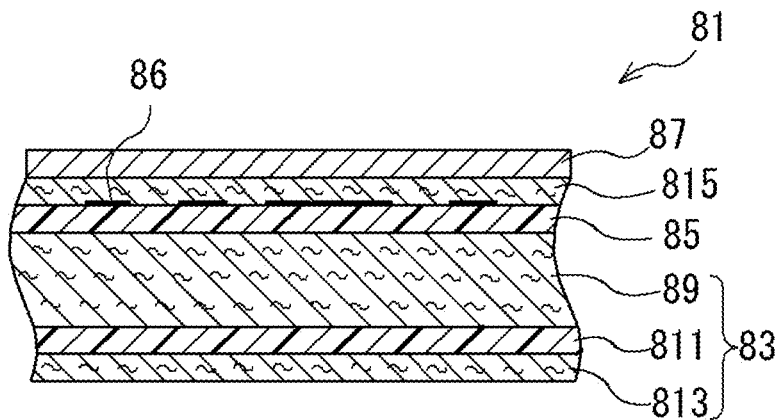
FIG. 11 is a schematic cross-sectional view illustrating an example of the vehicular interior material according to the fourth aspect of the invention.
Figure 12:
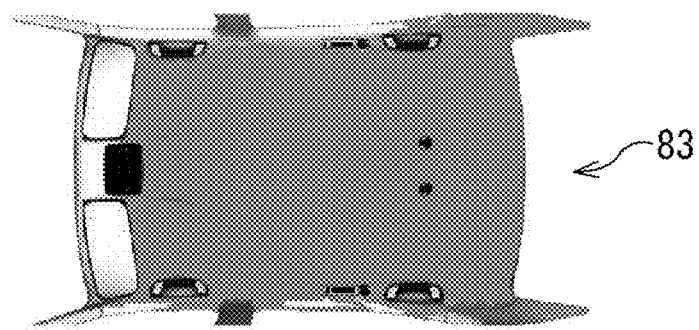
FIG. 12 is a schematic plan view illustrating the vehicular interior materials of Examples 3-1 and 3-2 (when light is not emitted)
Figure 13:
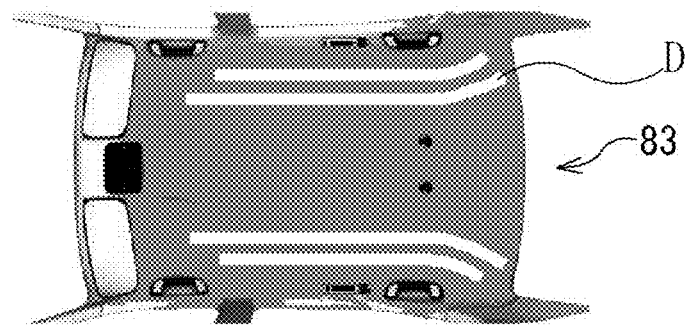
FIG. 13 is a schematic plan view illustrating the vehicular interior material of Example 3-1 (when light is emitted)
Figure 14:
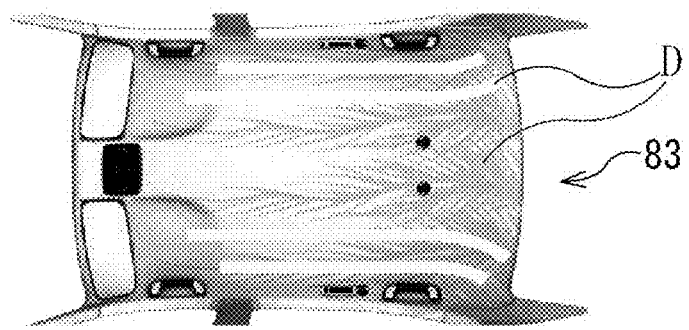
FIG. 14 is a schematic plan view illustrating the vehicular interior material of Example 3-2 (when light is emitted).

Interior materials 81 in Examples 3-1 and 3-2 are used as a vehicular ceiling interior material. As illustrated in FIG. 11,

TABLE 2

| | Example | | | | | | | |
|---|---|---|---|---|---|---|---|---|
| | 2-1 | 2-2 | 2-3 | 2-4 | 2-5 | 2-6 | 2-7 | 2-8 |
| Center illuminance (lx) through non-print area | 0.65 | 0.65 | 0.65 | 0.65 | 0.65 | 0.65 | 0.65 | 0.65 |
| Center illuminance (lx) through print area | 0.34 | 0.39 | 0.45 | 0.48 | 0.53 | 0.54 | 0.50 | 0.60 |
| Difference DD2 (%) in transmittance | 47.7 | 40.0 | 30.8 | 26.2 | 18.5 | 16.9 | 23.1 | 7.7 |
| Evaluation of design | 1 | 1 | 1 | 1 | 1 | 1 | 1 | 2 |

(3-2) Evaluation of Design when Light is Emitted from Interior Material

The illumination means 75 of each interior material 71 (Examples 2-1 to 2-8) was turned on to form an image, on the surface of the skin layer 77, based on the print area 76 on the back side of the skin layer 77 of each interior material 71. Whether or not the image appears on the surface of the skin layer 77 and can be observed, and the design properties were evaluated in accordance with the following criteria. The the interior material 81 sequentially included a translucent base layer 83, an air-barrier film layer 85, a scrim layer 815, and an illumination means 87.

The translucent base layer 83 was formed using a multi-layer structure sequentially including a fiber base layer 89, an adhesive film layer 811, and a skin layer 813, and having a transmittance measured by the above method (see (1-2)) of 45%.

The fiber base layer 89 was formed using a fiber base that was produced using fibers (glass fibers), a thermoplastic resin (polypropylene), and a blowing agent. The fiber content in the fiber base layer 89 is 35% by mass based on 100% by mass of the fiber base layer 89.

The adhesive film layer 811 was formed using a polypropylene (PP) film.

The skin layer 813 was formed using a surface material including PET fibers.

The translucent base layer 83 had a basis weight of 430 g/m² (fiber base layer 89: 400 g/m², adhesive film layer 811: 30 g/m²), and a thickness of 5 mm.

The air-barrier film layer 85 was formed using a laminate film consisting of polyamide (PA (base layer)) and polypropylene (PP (adhesive layer)), and having a thickness of 30 μm. The air-barrier film layer 85 was provided so that PP was positioned on the side of the fiber base layer 89.

A print area (decorative part) 86 was formed on one side of the air-barrier film layer 85 by screen printing. The air-barrier film layer 85 was provided so that the print area 86 was positioned on the side of the scrim layer 815. The vehicular interior materials produced in Examples 3-1 and 3-2 were provided with a different print pattern.

The scrim layer 815 was formed using a spunbond nonwoven fabric.

The illumination means 87 was formed using a surface-emitting luminous body (light source: LED).

(4-2) Effects of Vehicular Interior Material

When the illumination means 87 included in each vehicular interior material 81 (Examples 3-1 and 3-2) was turned on, a passed light through the air-barrier film layer 85 and translucent base layer 83 drew an image based on the print area (decorative part) 86 formed on the air-barrier film layer 85 on the surface of the skin layer 813. Each design D could be clearly observed (see FIG. 16 (Example 3-1) and FIG. 17 (Example 3-2)). When light was not emitted from the illumination means 87, the design D was not observed (see FIG. 15).

Since the vehicular interior materials 81 produced in Examples 3-1 and 3-2 included the translucent base layer 83 including the fiber base layer 89, the vehicular interior materials 81 also exhibit an excellent sound-absorbing capability.

In the vehicular interior materials 81 produced in Examples 3-1 and 3-2, the air-barrier film layer 85 having the print area (decorative part) 86 is provided on the back side (ceiling side) of the translucent base layer 83 having a sound-absorbing capability, differing from the illumination apparatus disclosed in JP-A 2009-101840 (i.e., a film having a pattern is provided on the front side (interior side) of the translucent core material). Therefore, the sound-absorbing capability of the translucent base layer 83 is not impaired, and a sufficient sound-absorbing capability can be achieved.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The invention is not limited to the above embodiments, and various modifications may be made without departing from the scope of the invention.

INDUSTRIAL APPLICABILITY

Since the base of the present invention has a transmittance within a specific range, and exhibits sufficient flexural rigidity, the base can be widely used in the field of an illumination apparatus.

Since the illumination apparatus of the present invention can be easily assembled (attached) and removed, the illumination apparatus can be used as an illumination apparatus in various fields.

The interior material of the present invention can be used in various fields. For example, the interior material can be used in the fields of automobiles, rail vehicles, ships, airplanes, buildings, furniture, and the like.

The vehicular interior material of the present invention allows a design (e.g., pattern) that is not observed when light is not emitted to appear on the design surface when light is emitted. Therefore, the vehicular interior material can be widely used in the field of vehicular interior materials.

REFERENCE SIGNS LIST

1: base or base layer, 3: scrim layer, 5: air-barrier film layer, 7: fiber base layer, 9: adhesive film layer, 11: base, 13: scrim layer, 15: air-barrier film layer, 17: glass fiber layer, 19: diphenylmethane isocyanate adhesive layer, 21: polyurethane foam layer, 23: diphenylmethane isocyanate adhesive layer, 25: glass fiber layer, 31: base, 33: scrim layer 35: air-barrier film layer, 37: adhesive film layer, 39: glass fiber layer, 41: adhesive film layer, 43: polyurethane foam layer, 45: adhesive film layer, 47: glass fiber layer, 49: adhesive film layer, 51: irradiation target surface, 53: surface-emitting light source, 55: emitting surface, 57: base, 59: emitting surface, 61: illumination apparatus, 63: skin layer, 65: light source, 71: interior material, 73: translucent base or translucent base layer, 75: illumination means, 76: decorative part (print area), 77: skin layer or surface material, 79: scrim layer, 711: air-barrier film layer, 713: fiber base layer, 715: adhesive film layer, 716: strike through-prevention nonwoven fabric layer, 717: surface-emitting light source, 719: irradiation target surface, 721: irradiation target surface, 723: surface-emitting light source, 725: emitting surface, 727: translucent base, 729: emitting surface, 81: vehicular interior material, 83: translucent base or translucent base layer, 85: air-barrier film layer, 86: decorative part (print area), 87: illumination means, 89: fiber base layer, 811: adhesive film layer, 813: skin layer, 815: scrim layer, 817: irradiation target surface, 819: surface-emitting light source, 821: emitting surface, 823: emitting surface, D: design that has appeared (appeared image)

What is claimed is:

1. A base comprising a fiber base layer that includes fibers, wherein a basis weight of the base is in a range from 300 to 1,500 g/m², wherein a thickness of the base is in a range from 1 to 10 mm, wherein a content of fibers in the fiber base layer is in a range from 20% to 70% by mass based on 100% by mass of the fiber base layer, and wherein the base has a transmittance calculated by an equation of $[(B/A) \times 100(\%)]$ of 35% to 75%, where, A is an illuminance measured at an irradiation target surface directly under a center of a surface-emitting light source (100 mm×100 mm) when a light is emitted from the surface-emitting light source that is disposed at a distance of 600 mm from the irradiation target surface so that an emitting surface of the surface-emitting light source is parallel to the irradiation target surface, and B is an illuminance measured at the irradiation target surface directly under the center of the surface-emitting light source when a light is emitted from the surface-emitting light source that is disposed on a back side of the base, the base being disposed at a distance of 600 mm from the irradiation target surface so that an emitting surface of the base is parallel to the irradiation target surface.

2. An illumination apparatus comprising the base according to claim 1, and a light source which is provided on a back side of the base,
wherein a light emitted from the light source passes through the base from the back side to a front side of the base.

3. The illumination apparatus according to claim 2,
wherein the base comprises a skin layer on a surface side of the base, the skin layer having a print area and a non-print area at an inner side, and an image based on a design at the skin layer appears on a front side of the skin layer when a light emitted from the light source passes through the skin layer, and
wherein a difference DD1 in transmittance for the skin layer calculated by $[|(X1-Y1)/X1|\times100(\%)]$ is in a range from 5% to 60%, where, X1 is an illuminance measured at an irradiation target surface directly under the non-print area when a light is emitted from the surface-emitting light source, and Y1 is an illuminance measured at the irradiation target surface directly under the print area when a light is emitted from the surface-emitting light source, the surface-emitting light source being placed on a back side of the skin layer, and the irradiation target surface being positioned at a distance of 600 mm from the front side of the skin layer so that the irradiation target surface is parallel to the front side of the skin layer.

4. The illumination apparatus according to claim 2,
wherein the base comprises an air-barrier film layer on a back side thereof, the air-barrier film layer being decorated, and an image based on a design at the air-barrier film layer appears on a surface of the base when a light emitted from the light source passes through the air-barrier film layer.

5. The illumination apparatus according to claim 4,
wherein an adhesive layer is provided on at least one side of the air-barrier film layer.

6. The illumination apparatus according to claim 4,
wherein the air-barrier film layer is decorated by printing.

7. An interior material comprising a translucent base, an illumination source that is provided on a back side of the translucent base, and a skin layer that is provided on a surface side of the translucent base,
wherein the skin layer has a print area and a non-print area at a side of the translucent base, and an image based on a design at the skin layer appears on a front side of the skin layer when a light emitted from the illumination source passes through the skin layer, and
wherein a difference DD2 in transmittance for the skin layer calculated by equation of $[|(X2-Y2)/X2|\times100(\%)]$ is in a range from 5% to 60%, where, X2 is an illuminance measured at an irradiation target surface directly under the non-print area when a light is emitted from a surface-emitting light source (100 mm×100 mm), and Y2 is an illuminance measured at the irradiation target surface directly under the print area when a light is emitted from the surface-emitting light source, the surface-emitting light source being placed on a back side of the skin layer, and the irradiation target surface being positioned at a distance of 600 mm from the front side of the skin layer so that the irradiation target surface is parallel to the front side of the skin layer.

8. The interior material according to claim 7,
wherein the translucent base comprises a fiber base layer that includes fibers,
wherein a basis weight of the base is in a range from 300 to 1,500 g/m$^2$,
wherein a thickness of the base is in a range from 1 to 10 mm,
wherein a content of fibers in the fiber base layer is in a range from 20% to 70% by mass based on 100% by mass of the fiber base layer, and
wherein the base has a transmittance calculated by an equation of $[(B/A)\times100(\%)]$ of 35% to 75%, where, A is an illuminance measured at an irradiation target surface directly under a center of the surface-emitting light source when a light is emitted from the surface-emitting light source that is disposed at a distance of 600 mm from the irradiation target surface so that an emitting surface of the surface-emitting light source is parallel to the irradiation target surface, and B is an illuminance measured at the irradiation target surface directly under the center of the surface-emitting light source when a light is emitted from the surface-emitting light source that is disposed on a back side of the base, the base being disposed at a distance of 600 mm from the irradiation target surface so that an emitting surface of the base is parallel to the irradiation target surface.

9. A vehicular interior material comprising a translucent base, an air-barrier film layer that is provided on a back side of the translucent base, and an illumination source that is provided on a back side of the air-barrier film layer,
wherein the translucent base comprises a fiber base layer that includes fibers,
wherein a basis weight of the base is in a range from 300 to 1,500 g/m$^2$,
wherein a thickness of the base is in a range from 1 to 10 mm,
wherein a content of fibers in the fiber base layer is in a range from 20% to 70% by mass based on 100% by mass of the fiber base layer, and
wherein the base has a transmittance calculated by an equation of $[(B/A)\times100(\%)]$ of 35% to 75%, where, A is an illuminance measured at an irradiation target surface directly under a center of a surface-emitting light source (100 mm×100 mm) when a light is emitted from the surface-emitting light source that is disposed at a distance of 600 mm from the irradiation target surface so that an emitting surface of the surface-emitting light source is parallel to the irradiation target surface, and B is an illuminance measured at the irradiation target surface directly under the center of the surface-emitting light source when a light is emitted from the surface-emitting light source that is disposed on a back side of the base, the base being disposed at a distance of 600 mm from the irradiation target surface so that an emitting surface of the base is parallel to the irradiation target surface, and wherein the air-barrier film layer is decorated, and an image based on a design at the air-barrier film layer appears on a front side of the vehicular interior material when a light emitted from the illumination source passes through the air-barrier film layer.

10. The vehicular interior material according to claim 9, wherein an adhesive layer is provided on at least one side of the air-barrier film layer.

11. The vehicular interior material according to claim 9, wherein the air-barrier film layer is decorated by printing.

* * * * *